(12) United States Patent
Myers

(10) Patent No.: US 12,076,674 B1
(45) Date of Patent: Sep. 3, 2024

(54) FILTRATION METHOD AND APPARATUS

(71) Applicant: Jeff D Myers, Phoenix, AZ (US)

(72) Inventor: Jeff D Myers, Phoenix, AZ (US)

( * ) Notice: Subject to any disclaimer, the term of this patent is extended or adjusted under 35 U.S.C. 154(b) by 226 days.

(21) Appl. No.: 16/602,921

(22) Filed: Dec. 24, 2019

Related U.S. Application Data

(60) Provisional application No. 62/787,446, filed on Jan. 2, 2019.

(51) Int. Cl.
| | |
|---|---|
| *B01D 39/00* | (2006.01) |
| *B01D 29/01* | (2006.01) |
| *B01D 29/11* | (2006.01) |
| *B01D 39/08* | (2006.01) |
| *C12H 1/07* | (2006.01) |
| *C12H 1/00* | (2006.01) |

(52) U.S. Cl.
CPC ........... *B01D 39/083* (2013.01); *B01D 29/01* (2013.01); *B01D 29/11* (2013.01); *C12H 1/063* (2013.01); *B01D 2201/02* (2013.01)

(58) Field of Classification Search
CPC ........ B01D 15/00; B01D 21/00; B01D 23/00; B01D 23/02; B01D 23/04; B01D 23/06; B01D 23/28; B01D 29/00; B01D 29/0002; B01D 29/0004; B01D 29/0006; B01D 29/0009; B01D 29/0018; B01D 29/0022; B01D 29/0027; B01D 29/0029; B01D 29/0034; B01D 29/0036; B01D 29/0038; B01D 29/004; B01D 29/0043; B01D 29/0045; B01D 29/0093; B01D 29/0095; B01D 29/0097; B01D 29/01; B01D 29/012; B01D 29/014; B01D 29/016; B01D 29/03; B01D 29/05; B01D 29/11; B01D 29/111; B01D 29/13; B01D 39/00; B01D 39/08; B01D 39/083; B01D 39/14; B01D 2201/02; B01D 2201/18; B01D 2201/184; B01D 2239/00; B01D 2239/02; B01D 2239/0208; B01D 2239/0266; B01D 2239/06; B01D 2239/0604; B01D 2239/0613; B01D 2257/00; B01D 2257/70; B01D 2257/702; C12H 1/00; C12H 1/06; C12H 1/063; C12H 3/00; C12H 3/04; C12H 6/00; C12G 1/00; C12G 1/14; C12G 3/00; C12G 3/08; C12C 12/04
See application file for complete search history.

(56) References Cited

U.S. PATENT DOCUMENTS

2012/0184166 A1 * 7/2012 Kurihara ................ D01F 6/82
442/181

OTHER PUBLICATIONS

MoreWine, Plate Filtering, 8 pages, Accessed online Nov. 22, 2021 (Year: 2017).*

* cited by examiner

*Primary Examiner* — Allison G Fitzsimmons
(74) *Attorney, Agent, or Firm* — Tod R. Nissle

(57) ABSTRACT

Apparatus to filter liquor includes at least one woven layer. The layer comprises strands that are naturally produced by a living thing, include domains of hydrophilic amino acids, include domains of hydrophobic amino acids, have a triangular cross section to produce turbulent liquid flow, have weft threads parallel to other weft threads, have warp threads parallel to other warp threads at an angle to the weft threads, have at least one of the pair consisting of negatively charged amino acid and positively charged amino acids, and have a denier in the range of 0.75 to 1.25.

1 Claim, 3 Drawing Sheets

FILTRATION METHOD AND APPARATUS

This application claims priority based on U.S. Provisional Patent Application Ser. No. 62/787,446 filed Jan. 2, 2019.

This invention relates to spirits.

More particularly, the invention concerns the filtration of spirits.

Being able to filter spirits or other alcoholic beverage without adversely affecting color, flavor, or smoothness of the beverage is important.

Those of skill in the art therefore have, for many years, attempted to develop filtration techniques which provide the ability to control the color, flavor, and smoothness of the beverage.

Therefore it would be advantageous to develop improved filtration techniques in connect with alcoholic beverages.

Accordingly, it is a principal goal of the invention to provide improved filtration techniques for alcoholic beverages.

This, and other further goals, will be apparent from the following detailed description thereof, taken in connection with the drawings, in which.

Figure 5:
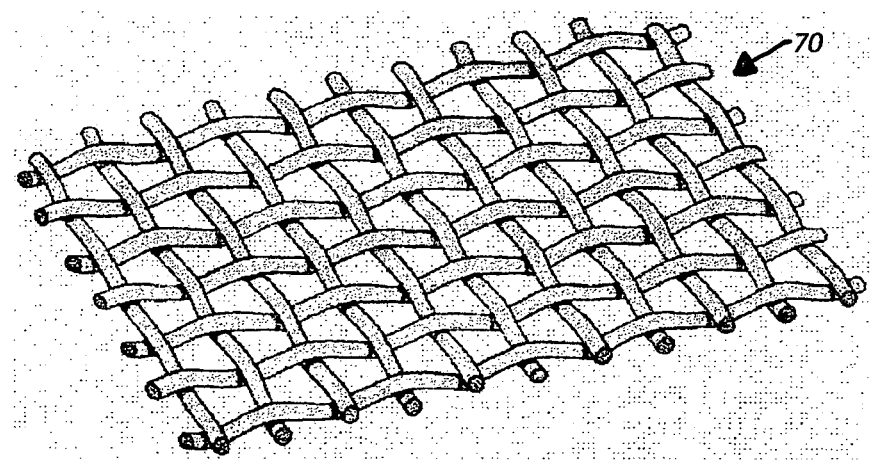
FIG. 5 is a perspective view illustrating a section of woven silk fabric and the openings which are formed through the fabric and have a square cross-section.

Turning now to the description of the invention, which is provided by way of illustration and not limitation, and in which like reference characters in the drawings refer to like features, FIG. 5 illustrates a section of woven silk fabric identified by reference character 70 and including weft threads which are perpendicular to warp threads such that openings with a square cross section are formed through the fabric. The angle between weft and warp threads can vary as desired. Regardless of such angle, weft threads are presently preferably parallel to other weft threads, and warp threads are presently preferably parallel to other warp threads.

Figure 2:
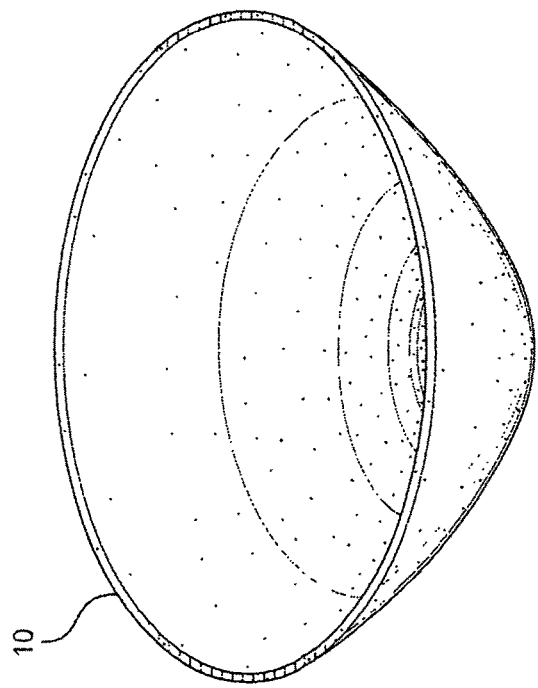
FIG. 2 is a perspective view of the woven silk fabric of FIG. 1 illustrating further details thereof.
Figure 4:
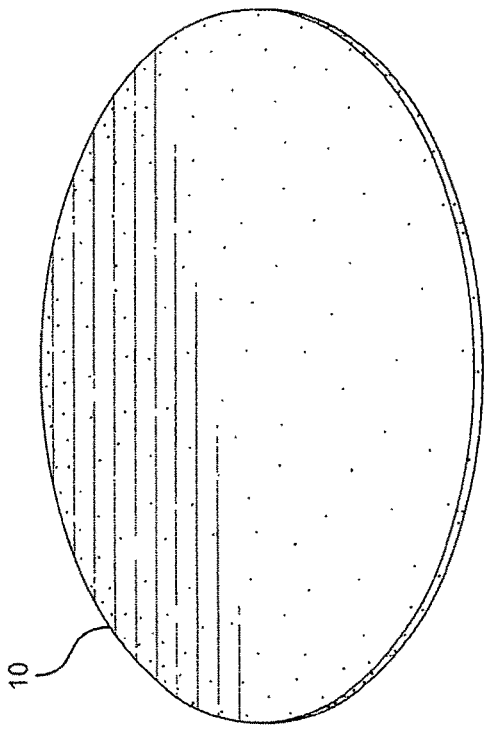
FIG. 4 is a perspective view of a conically shaped woven silk fabric.
Figure 1:
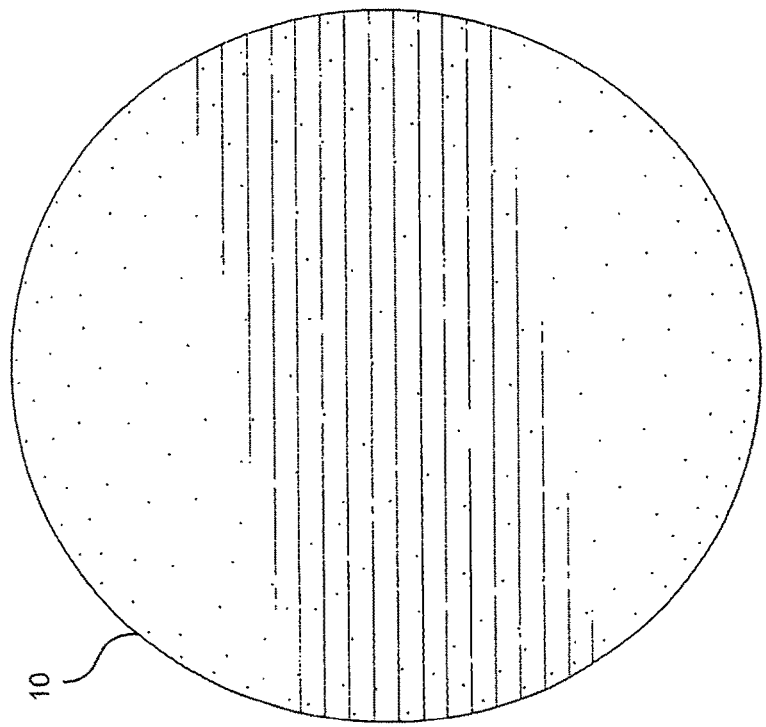
FIG. 1 is a top view illustrating a circular piece of woven silk fabric.
Figure 3:
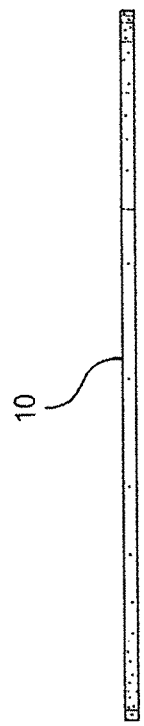
FIG. 3 is a side view of the woven silk fabric of FIG. 1.

FIGS. 1, 2, and 3 illustrate a circular panel 10 of silk fabric. In FIG. 4, the panel 10 has been formed into a conical shape.

Figure 6:
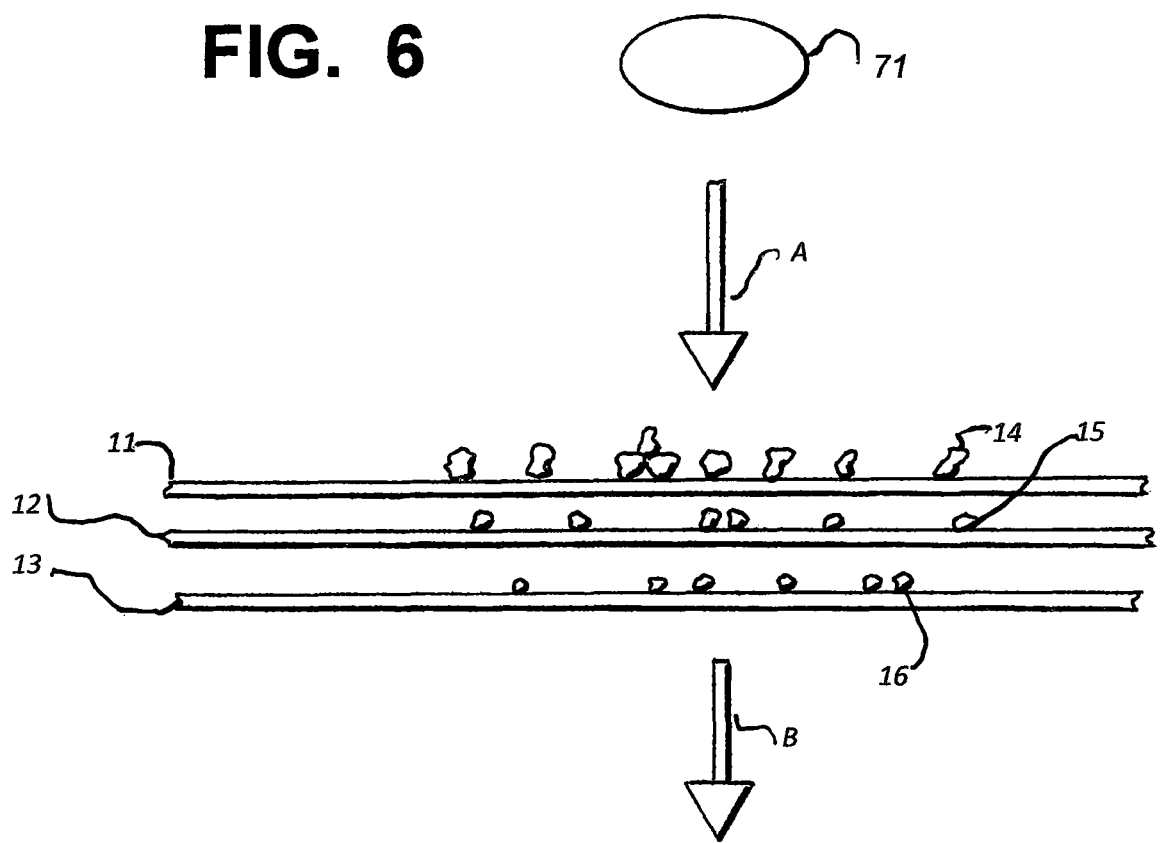
FIG. 6 is a side elevation view illustrating several fabric layers utilized to filter successively smaller particle from a pressurized liquid impinging and flowing through the layers.

FIG. 6 illustrates several layers 11, 12, 13 of woven silk fabric used to remove successively small solid particles 14, 15, 16 from a liquid flowing through the layers in the direction indicated by arrow A and B. The orientation of layers 11, 12, 13 can vary as desired but will, as would be appreciated by those skill in the art, normally be in the horizontal orientation illustrated in FIG. 6 if gravity is the lone force propelling a liquid through layers 11, 12, 13. As can be seen in the depiction in FIG. 6, layer 11 removes first larger particles 14; layer 12 removes particles 15 which are smaller than particles 14; and layer 13 removed particles 16 which are small than particles 15. Further, in FIG. 6 a unit 71 puts the under pressure liquid flowing in the direction A. The pressure generated on the liquid is presently about 50 psi, but can vary as desired.

Figure 7:
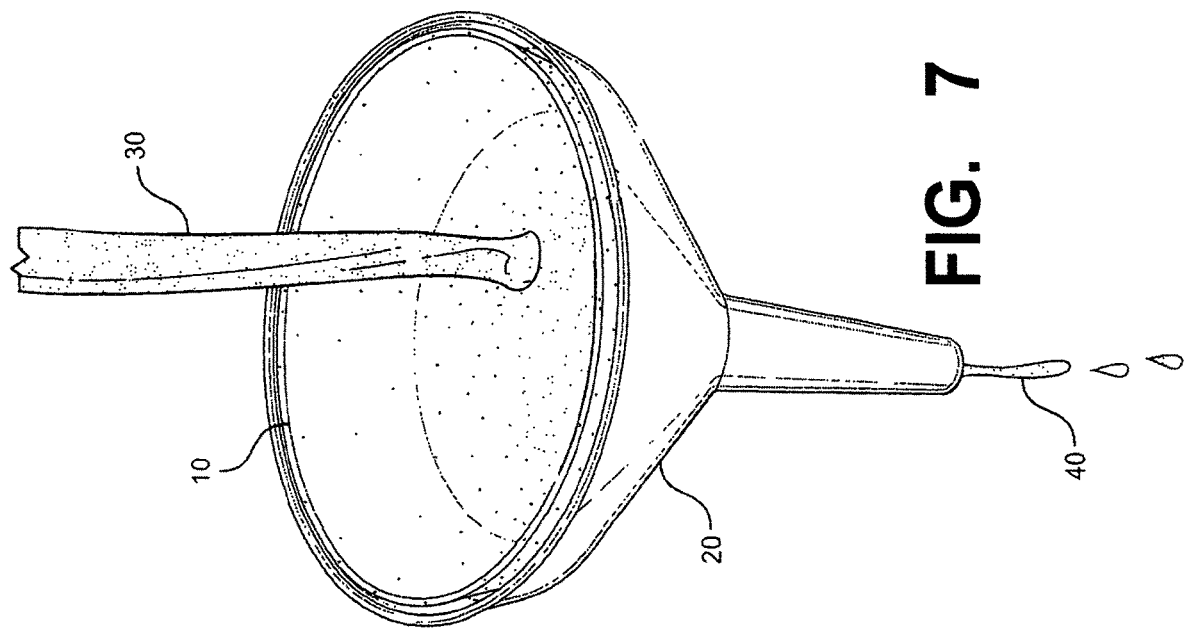
FIG. 7 is a perspective view of the conically shaped woven silk fabric lining the interior surface of a funnel.

FIG. 7 illustrates panel 10 lining the interior of funnel 20; and, illustrate fluid 30 impinging and flowing through panel 10 and exiting 40 the bottom of funnel 20.

Figure 8:
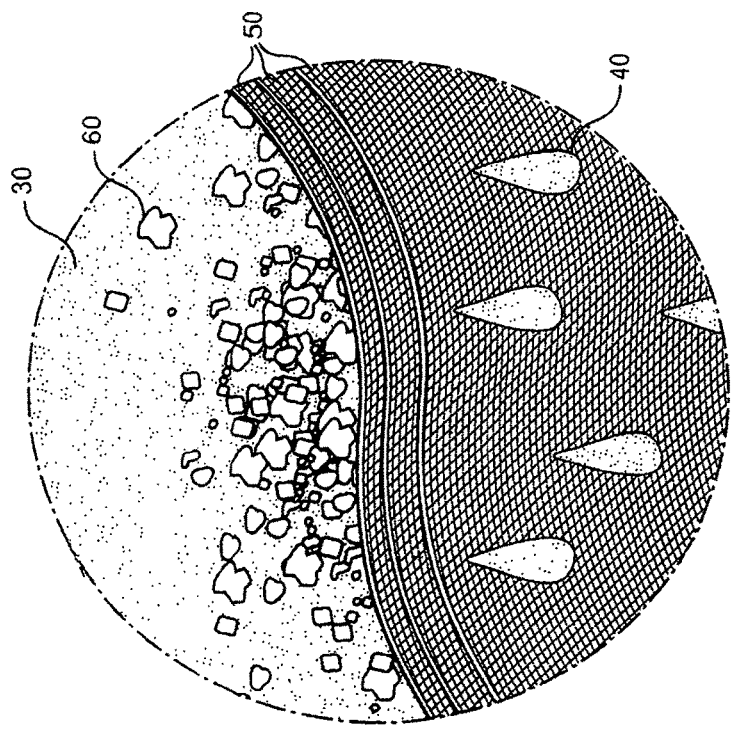
FIG. 8 is a section view illustrating the use of several fabric layers to remove particles from a liquid.

In FIG. 8, particles 60 in fluid 30 are captured by silk fabric layers 50 when fluid 30 flows through 40 layers 50.

As used herein, there are two kinds of filtration. The first is mechanical filtration in which solid particles of a particular size are removed by passing a liquid through a mesh which has openings that prevent solid particles of a particular size from passing through the mesh. The second is carbon filtration which works by absorption. Absorption is the adhesion of particles to a surface.

The mesh used in mechanical filtration can, by way of example and not limitation, be pressed like the paper filter in a coffee maker or can be woven. A cellulose or paper filter is used in chill filtration. During chill filtration, an alcoholic beverage is chilled to a certain degree and then is then filtered through a cellulose or other paper filter to remove fatty acids and esters. Such esters and fatty acids are less soluble at low temperatures.

An alcoholic beverage is called smooth if it feels silky in the mouth of a user, minimizes the burn sensation, or has a desirable flavor.

As used herein an alcoholic beverage contains at least 3% by volume alcohol. On average, beer contains around 5%, wine around 12%, and liquor around 37%. Note however, that these figures can vary substantially depending on the particular beer, wine, or liquor being evaluated.

One way a "silky" feeling can be produced is with glycerin. Glycerin increases the viscosity of an alcoholic beverage which helps produce a "silky" feeling.

The burn sensation can be minimized by adding water, adding sugar, or having a strong flavor.

Impurities like esters and furfural may contribute to a burn sensation.

Flavor in an alcohol beverage can be produced or affected by solid particulate in the beverage or by chemical components that are in solution in the beverage.

Charcoal (carbon) filtration may remove some flavor or color from an alcoholic beverage.

Charcoal filtration has long been used in connection with alcoholic beverages including, for example, whiskey, rum, vodka, tequila, rum, and cognac. Paper filtration is sometimes used as, for example, in chill filtration. Sieves fabricated from metal are well known, but can be relatively expensive to produce and use and do not appear to be utilized in the alcoholic beverage industry.

It was believed advantageous to produce a filtration system and apparatus which would not require the production of charcoal, would be easily packaged and shipped, would be usable by industry and consumers alike, would require the use of a renewable resource, which would not appear to adversely affect the color and flavor of an alcoholic beverage, which could be utilized under pressure, and which could be readily adapted to remove from an alcoholic beverage solid particulate having any of a wide variety of sizes. While attempting to meet these goals, the idea developed of using some kind of a pliable cloth filter. Such a filter could be easily packaged and shipped. But whether such a filter could be utilized under pressure and be fabricated to remove any of a variety of particle sizes remained to be seen. Some of the assessments made concerning such a cloth filter are set forth below.

REVIEW NO. 1: Cotton polyester knit. The knit of this fabric allowed it to stretch. The openings between the threads would increase in size if pressure was applied to the fabric. Consequently, the fabric did not permit ready control of the size of particle filtered by the fabric.

REVIEW NO. 2: Knit nylon fabric. This fabric stretched less than the cotton polyester knit in REVIEW NO. 1, but still had enough "give", so that the openings between the threads would increase in size if pressure was applied to the fabric.

REVIEW NO. 3: Woven silk fabric "A". The silk was from silk worms. This fabric was not stretchy, but when liquid under a pressure of about 50 psi was filtered, the size of particle that was NOT filtered out increased in size. As used herein, the term silk refers to silk naturally produced by silk worms or spiders. Such naturally produced silk fiber has a triangular cross-section. The triangle has three rounded corners. The corners function to create eddies when fluid flows through a woven silk fabric. Such eddies are less likely when a fiber has a circular cross section. The eddies function to help free up any particles that are small enough to pass through openings in silk fabric, but that are "stuck". Sometimes a pair of particles "wedge" together in an opening in silk fabric and the eddy currents create turbulence which help free such wedged particles.

Silk strands are also transparent and have a smooth surface. This facilitates determining the presence of particles on silk fibers by shining light through the fibers to view solid particles trapped on silk fabric.

Silk worms are actually caterpillars.

REVIEW NO. 4: Cotton fabric. This fabric would stretch sufficiently to allow the size of openings between threads to vary considerably.

REVIEW NO. 5: Wool fabric. This fabric would, like cotton, stretch sufficiently to allow the size of openings between threads to vary considerably.

REVIEW NO. 6: Polyester fabric "A". This fabric appeared to stretch little, but under a pressure of about 50 psi would appear to begin to allow larger particles to pass through the fabric.

REVIEW NO. 7: Polyester fabric "B". This fabric appears not to stretch, but under a pressure of about 50 psi would appear to begin to allow larger particles to pass through the fabric.

REVIEW NO. 8: Fabric made from spider silk. This fabric appeared not to stretch, and under a pressure of about 50 psi appeared to not allow an increase in the size of particles that would pass through the fabric.

REVIEW NO. 9: Silk fabric "B". The silk was from silk worms. This fabric appeared not to stretch, and under a pressure of about 50 psi appeared to not allow an increase in the size of particles that would pass through the fabric.

Based on the foregoing preliminary review, a further secondary review of the non-stretchy fabrics was made.

REVIEW NO. 10: Woven silk fabric "A". The weft and warp threads were of different size. This likely allowed the threads to shift under pressure, which would vary the size of the openings between the threads.

REVIEW NO. 11: Polyester fabric "A". The fabric was not tightly woven. Many fibers will not straight and not parallel to other fibers. This would allow the fibers to move such that the size of openings between the fibers would vary.

REVIEW NO. 12: Polyester fabric "B". The weft and warp stitches differed in size, which likely would allow fibers to move such that the size of openings between the fibers would vary, especially when a liquid under pressure passed through the fabric.

REVIEW NO. 13: Woven silk fabric "B". The weft and warp threads were of the same size, which likely reduced the chance of threads moving under pressure.

REVIEW NO. 14: Woven spider silk. The weft and warp threads were of the same size, which likely reduced the chance of threads moving under pressure.

Based on the foregoing secondary review, a further tertiary review was made of the silk and spider fabrics. The polyester fabric were dropped because (1) they require artificial processes to be produced, (2) it was believed that any chemical compounds that would "bleed" from the fabrics into liquid being filtered by the compounds would more likely be toxic because the fabrics are made using artificial processes, (3) silk threads harvested from a natural renewable resource, and (4) the silk and spider fabrics were comprised of natural biodegradable proteins which were believed less likely adversely to interact with alcohol beverages. Silk is also has hydrophobic amino acid domains, which minimizes water absorption.

Silkworm silk has proteins which comprise a unique family of natural fibrous proteins. The molecular structure of such proteins include domains or regions or "mofits" of hydrophobic amino acids. Short and more hydrophilic regions are interposed between the hydrophobic amino acids. Most of the charged amino acids are in the hydrophilic regions. The major components of silk are fibroin and sericin. Fibroin is the core of silk. Sericin envelops fibroin with sticky layers that promote the production of a cocoon. Further, a single strand of silk is very fine and has a denier of about one (i.e., a denier in the range of 0.5 to 1.5 denier, preferably 0.75 to 1.25 denier, and more preferably 0.9 to 1.1 denier). A 9000 meter long strand of silk weighs about one gram. Silk proteins have favorable mechanical properties. Tunable degradation rates range from week to month in vivo.

There are twenty common amino acids. About nine (9) of these amino acids have non-polar R-groups and are relatively hydrophobic. Six (6) of the other remaining amino acids have strongly polar R-groups. These R groups can readily attract water molecules and are hydrophilic amino acids. The last five (5) remaining amino acids, have R-groups which can ionize. These five (5) R-groups can become electrically charged and become even more hydrophilic than the polar amino acids. R-groups often develop a negative charge.

Ionized R-groups and the ability of protein R groups to become electrically charged is believed important in the invention because it facilitates the removable from an alcohol or other beverage of electrically charged particles.

Spider silk proteins, like silk worm proteins, have domains or regions of amino acids. These domains combine into larger repetitive units. The units have a length include from less than 50 to over 200 amino acids. Ten to 100 of the modules link together and form the majority of the complete spider protein. A single strand of spider silk is also very fine.

REVIEW NO. 15: The woven silk fabric of REVIEW NO. 13 is obtained. The weft and warf threads are of equivalent size to within plus or minus 5% of each other. Amber colored tequila is obtained. A four square inch single layer of the silk fabric is utilized. A 12 ounce volume of tequila is filtered through the silk fabric under only the force of gravity. It requires about one hour to filter the tequila through the fabric. The color and flavor of the tequila do not change.

REVIEW NO. 16: The procedure of REVIEW NO. 15 is repeated, except that the 12 ounce quantity of tequila is applied to the top of the layer of silk fabric under a pressure of 50 psi. It required less than five minute to filter the tequila through the fabric. The color and flavor of the tequila do not change.

REVIEW NO. 17: The procedure of REVIEW NO. 15 is repeated, except two (2) layers of the silk fabric are utilized. Similar results are obtained.

REVIEW NO. 18: The procedure of REVIEW NO. 16 is repeated, except two (2) layers of the silk fabric are utilized. Similar results are obtained. Although two (2) layers of silk fabric are utilized in this REVIEW, the number of layers of fabric utilized can vary as desired.

REVIEW NO. 19: The procedure of REVIEW NO. 15 is repeated. The weft and warp threads are perpendicular to each other and form square openings each having a diagonal length of 0.5 mm.

REVIEW NO. 20: The procedure of REVIEW NO. 15 is repeated. The weft and warp threads are perpendicular to each other and form square openings each having a diagonal length of 0.25 mm.

REVIEW NO. 21: The procedure of REVIEW NO. 15 is repeated. The weft and warp threads are perpendicular to each other and form square openings each having a diagonal length of 0.10 mm.

Having described presently preferred embodiments in terms understandable to those skill in the art, I claim:

1. Apparatus to filter an alcoholic beverage comprising
   (a) a funnel including an inner surface
   (b) a filter comprising at least one woven layer of strands
      (i) including silk naturally produced by a living thing,
      (ii) including domains of hydrophilic amino acids,
      (iii) including domains of hydrophobic amino acids,
      (iv) having a triangular cross-section to produce turbulent liquid flow,
      (v) including weft threads parallel to other weft threads,
      (vi) including warp threads parallel to other warp threads and at an angle to said weft threads, said warp and weft threads being of equivalent size to within plus or minus 5% of each other,
      (vii) having at least one of a pair consisting of negatively charged amino acids and positively charged amino acids, and
      (viii) having a denier in the range of 0.75 to 1.25;
   said filter
      contacting and shaped and dimensioned to conform to said inner surface of said funnel, and,
      including at least in part strands each made only of said silk; and,
   (c) apparatus to direct said alcoholic beverage toward said filter under only the force of gravity for said alcoholic beverage to move though said filter.

* * * * *